Figures 4, 4A:
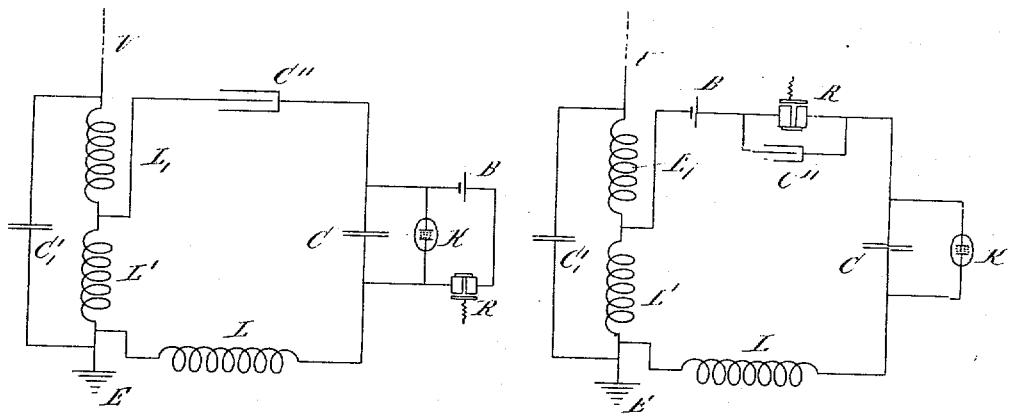

No. 767,995. PATENTED AUG. 16, 1904.
J. S. STONE.
SPACE TELEGRAPHY.
APPLICATION FILED FEB. 13, 1904.
NO MODEL. 9 SHEETS—SHEET 1.
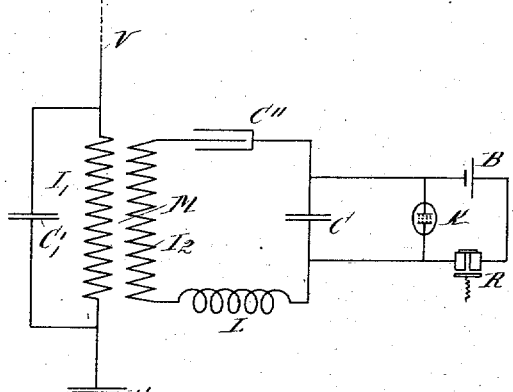
Fig. 1.
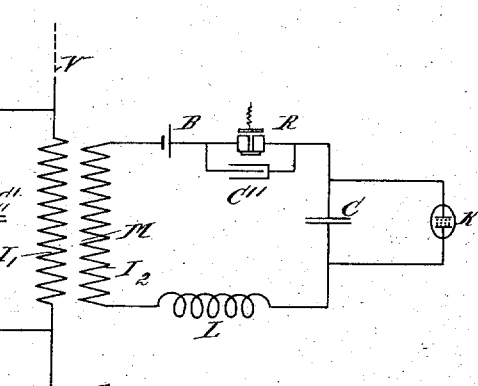
Fig. 1.ª
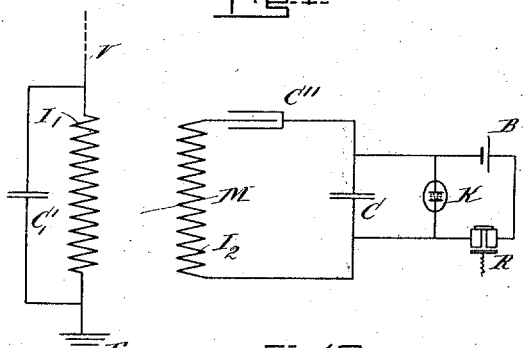
Fig. 2.
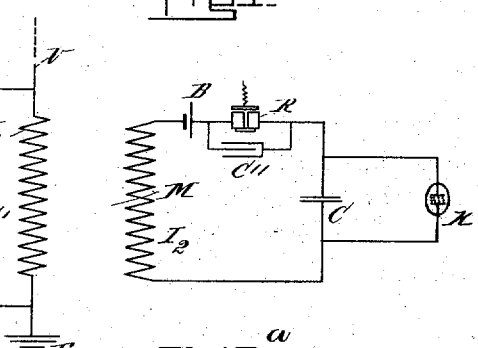
Fig. 2.ª
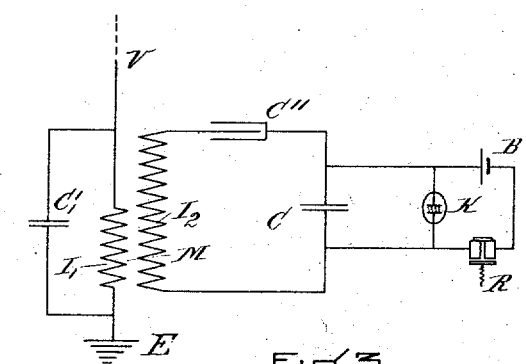
Fig. 3.
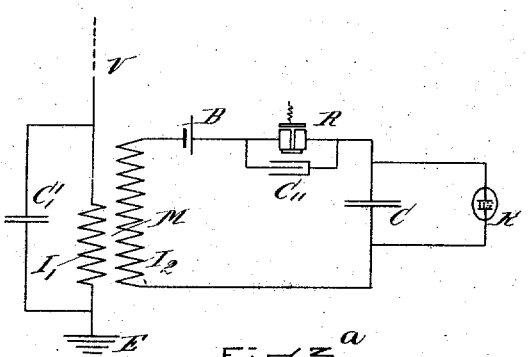
Fig. 3.ª
WITNESSES
Brainard V. Juskins
G. Adelaide Higgins
INVENTOR
John Stone Stone
by Alex. P. Browne
attorney No. 767,995. PATENTED AUG. 16, 1904.
J. S. STONE.
SPACE TELEGRAPHY.
APPLICATION FILED FEB. 13, 1904.
NO MODEL.
9 SHEETS—SHEET 2.

WITNESSES
Brainerd F. Judkins
J. Adelaide Higgins

INVENTOR
John Stone Stone
by Alex P. Browne
attorney

No. 767,995. PATENTED AUG. 16, 1904.
J. S. STONE.
SPACE TELEGRAPHY.
APPLICATION FILED FEB. 13, 1904.
NO MODEL. 9 SHEETS—SHEET 3.

WITNESSES:
Brainard T. Judkins
G. Adelaide Higgins

INVENTOR:
John Stone Stone
by Alex P. Browne
attorney

No. 767,995. PATENTED AUG. 16, 1904.
J. S. STONE.
SPACE TELEGRAPHY.
APPLICATION FILED FEB. 13, 1904.
NO MODEL. 9 SHEETS—SHEET 4.

WITNESSES:
Brainerd F. Judkins
I. Adelaide Higgins

INVENTOR=
John Stone Stone
by Alex. P. Browne
attorney

No. 767,995. PATENTED AUG. 16, 1904.
J. S. STONE.
SPACE TELEGRAPHY.
APPLICATION FILED FEB. 13, 1904.

NO MODEL. 9 SHEETS—SHEET 6.

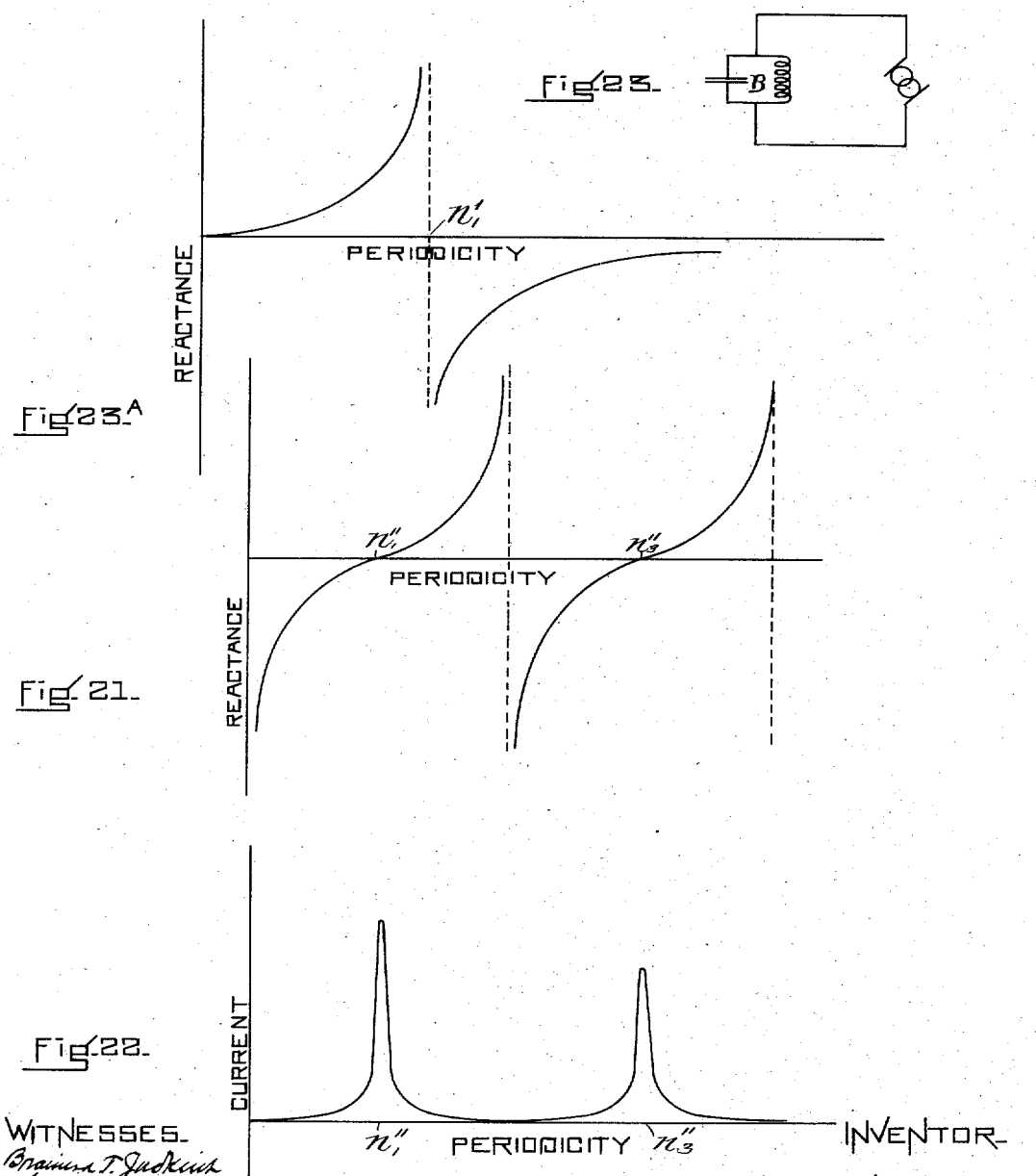

No. 767,995. PATENTED AUG. 16, 1904.
J. S. STONE.
SPACE TELEGRAPHY.
APPLICATION FILED FEB. 13, 1904.
NO MODEL. 9 SHEETS—SHEET 8.
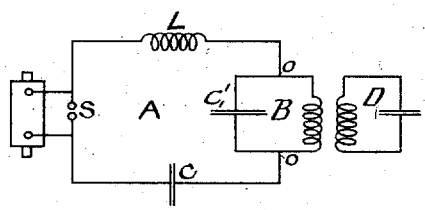
Fig. 24.
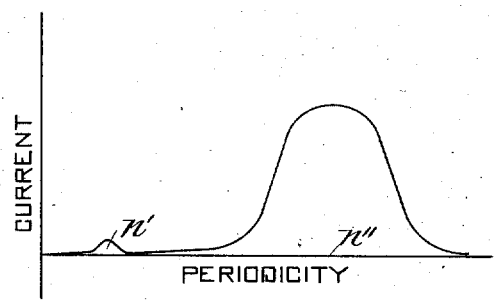
Fig. 24.$^A$
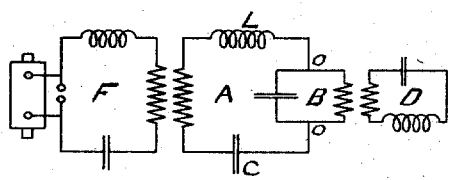
Fig. 25.
Fig. 25.$^A$
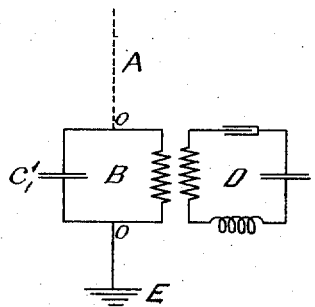
Fig. 26.
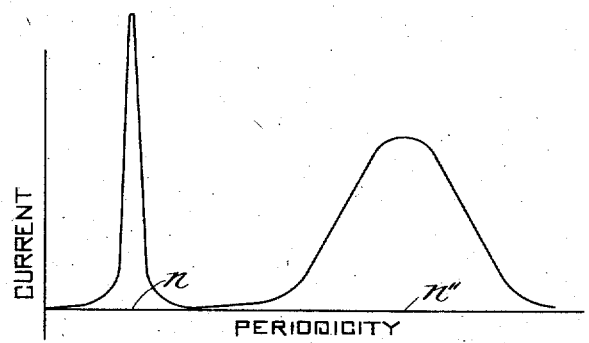
Fig. 26.$^A$
WITNESSES.
Brainerd T. Judkins
G. Adelaide Higgins.
INVENTOR.
John Stone Stone
by Alex. P. Browne,
attorney No. 767,995.                                                                                             Patented August 16, 1904.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

SPECIFICATION forming part of Letters Patent No. 767,995, dated August 16, 1904.

Application filed February 13, 1904. Serial No. 193,372. (No model.)

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

This invention relates to the art of transmitting intelligence from one station to another by means of electromagnetic waves without the use of wires to guide the waves to their destination, and it relates more particularly to methods for receiving signals transmitted by such waves.

The object of the present invention is to so adjust the elevated-conductor system of a wireless or space telegraph receiving-station relative to an associated tuned or resonant receiving circuit or circuits that, first, a persistent train of electromagnetic waves of a predetermined frequency impinging upon the elevated conductor shall cause the associated circuit or circuits to respond energetically; that, second, a persistent train of electromagnetic waves of frequency other than said predetermined frequency impinging upon the elevated conductor shall cause the associated tuned or resonant circuit or circuits to respond but feebly, and that, third, abrupt or impulsive electric forces acting upon the elevated conductor shall likewise produce but feeble response in the associated tuned or resonant circuit or circuits.

The first and second objects of this invention may be attained by giving the elevated receiving-conductor system a pronounced fundamental of a frequency which is the same as that to which the associated tuned or resonant receiving circuit or circuits is attuned.

The first and second objects of this invention may therefore be attained by placing a suitable inductance or capacity in the elevated conductor near its connection to earth, if it be an earthed elevated conductor, or at the center of a receiving-conductor, if it be an unearthed conductor, as thereby the receiving-conductor will be given a pronounced and predetermined fundamental, much as a stretched string may be given a predetermined and more pronounced fundamental by the addition of a suitable load at its center. If, therefore, the loading inductance or capacity added be made such as to give the elevated-conductor system a fundamental whose frequency is the same as that of the associated tuned or resonant receiving circuit or circuits, the first and second objects of the invention will be realized; but this simple device is not sufficient to accomplish the third object of the present invention, and for that purpose it is necessary to give the elevated conductor natural periods of vibration whose frequencies are different from that to which the associated tuned or resonant receiving circuit or circuits is attuned, and this in turn I accomplish by giving the elevated-conductor system a plurality of degrees of freedom, as will hereinafter be more fully described. In other words, I accomplish the third object of this invention by employing an elevated-conductor system whose natural rates of vibration are different from the frequency of the waves the energy of which is to be received, and consequently different from the frequency to which the associated tuned or resonant receiving circuit or circuits is attuned.

The invention may be best understood by having reference to the drawings which accompany and form a part of this specification and which illustrate diagrammatically a few of the forms of apparatus and circuit arrangements whereby the invention may be conveniently carried into effect. The apparatus and circuit arrangements, however, form no part of the present invention, having been claimed in my application, Serial No. 193,371, filed simultaneously herewith. Furthermore, my invention is broader than mere apparatus and is capable of being carried into effect by a great variety of apparatus and circuit arrangements.

In the drawings, Figures 1 to 20 represent space-telegraph receiving systems. Figs. 21 to 28 are diagrams hereinafter more fully referred to in explaining the theory of operation of the systems illustrated in Figs. 1 to 20.

In the figures, V is an elevated receiving-conductor. E is an earth connection. L is an auxiliary inductance-coil. $L_1$ L' are inductances included in series with the elevated conductor and the earth. $L_1'$ is an inductance connected in parallel with certain other tuning elements which are serially connected with the elevated conductor. C C'' are condensers serially included in the resonant circuits. $C_1$ C' are condensers included in series with the elevated conductor and the earth. $C_1'$ is a condenser connected in parallel with certain other tuning elements which are serially connected with the elevated conductor. M is a transformer which may be either a step-up or a step-down transformer, according to the character of the receiver or wave-detector employed. $I_1$ $I_2$ are respectively the primary and secondary windings of transformer M. K is a coherer or other suitable receiver or wave-detector. K' is a bolometer or other receiver or electric receptive device adapted to utilize in its operation the dissipative energy of the electrical oscillations developed in the circuit in which it is included. R is a relay or signal-indicating device.

In Fig. 1 I have shown one form of the invention herein described applied to a space-telegraph receiving system which I have fully described in my Letters Patent Nos. 714,756 and 714,831, dated December 2, 1902. Reference may therefore be had to said Letters Patent for a more complete description of the construction of parts and the operation thereof than is necessary to set forth herein, it being sufficient to state that by means of the auxiliary inductance L the effect of the mutual inductance between the resonant receiving-circuit $I_2$ C'' C L and the elevated-conductor system V $I_1$ $C_1'$ E is swamped and the complex of interrelated circuits is therefore reduced to the equivalent of a system of circuits each having but a single degree of freedom.

In Fig. 1ᵃ I have shown a slightly-different arrangement of the battery and relay, which are here included in series with the coil L and the condenser C, the condenser C'', which is a condenser of large capacity compared to the condenser C, serving to exclude the relay from the resonant circuit without producing an appreciable effect in the period of the resonant circuit and without appreciably lowering the resonant rise of potential at the terminals of the condenser C.

In Fig. 2 I have shown another form of the herein-described invention applied to a receiving system which I have described in my Letters Patent Nos. 714,832 and 714,833, dated December 2, 1902, and which I have described and claimed in my application, Serial No. 182,632, filed November 25, 1903. In this figure the function of the auxiliary coil L is performed by the transformer M, whose primary and secondary windings have such spatial interrelation as to reduce the complex of interrelated circuits to the equivalent of a system of circuits each having a single degree of freedom. The transformer-windings are here diagrammatically shown as parallel; but it is to be understood that this relation is by no means necessary in order to accomplish the desired result, inasmuch as this result may be accomplished if the windings have the proper angular interrelation. All that is necessary is that the transformer have sufficient magnetic leakage to render the self-energy of each of the interrelated circuits great as compared to the mutual energy of each circuit with respect to the other.

Fig. 2ᵃ corresponds to Fig. 2 and illustrates the same arrangement of battery and relay in the resonant circuit as is shown in Fig. 1ᵃ.

In Fig. 3 I have illustrated one embodiment of this invention applied to a receiving system which corresponds to the transmitting system described in my Letters Patent Nos. 714,832 and 714,833, dated December 2, 1902, and which shows one way in which the function of the auxiliary inductance-coil may be supplied by the secondary winding of the transformer M.

Another way, also described in said Letters Patent, in which the functions of the auxiliary inductance-coil may be performed by the transformer itself is illustrated in Fig. 2, described above. In both cases the principle is the same—i. e., the mutual energy of the interrelated circuits is made small compared with the self-energy of each circuit, and this in turn I accomplish by so designing the transformer that the square of the mutual inductance between its windings is made small compared to the product of the inductance of the primary winding by the inductance of the secondary winding. In the first case the external inductance-coil is made part of the transformer secondary without appreciably increasing the mutual inductance between the windings of the transformer. In the second case the transformer is given sufficient magnetic leakage to effect the desired result—i. e., the transformer is designed in the manner of a constant-current transformer. The two cases are equivalents, because it is well known that external inductance is the equivalent of magnetic leakage in constant-current transformers.

Fig. 3ᵃ corresponds to Fig. 3 and illustrates the same arrangement of battery and relay as is shown in Fig. 1ᵃ.

In Fig. 4ᵃ I have illustrated another form of the present invention applied to the receiving system described in my application, Serial No. 185,872, filed December 18, 1903. In this system the resonant circuit L' L C is conductively connected to the elevated receiving-conductor by the coil L' of inductance small compared to the inductance of the coil L.

Fig. 4 corresponds to Fig. 4ᵃ and shows a slightly-different arrangement of battery and relay which in this case are included in series with the coherer K in the manner shown in Fig. 1.

Figure 5:
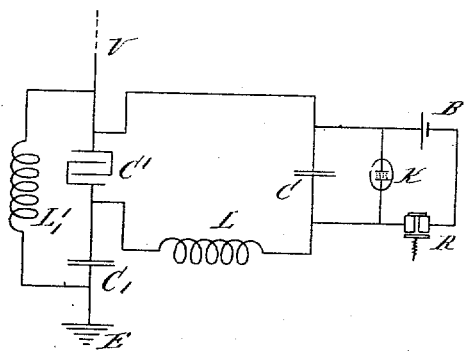
Figure 5A:
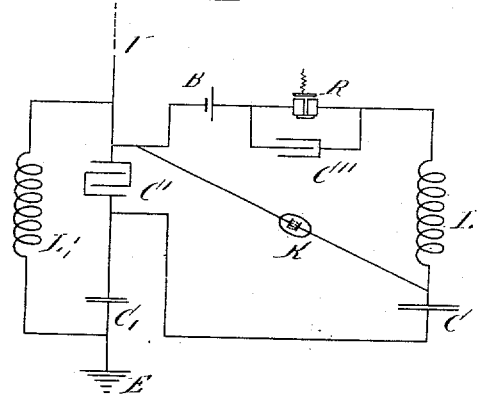

In Fig. 5ª I have shown another form of the present invention applied to the receiving system described in my application, Serial No. 185,873, filed December 18, 1903. In this system the resonant circuit is conductively connected to the elevated receiving-conductor by means of a condenser $C'$ of capacity great compared to the capacity of the condenser $C$.

Fig. 5 corresponds to Fig. 5ª and illustrates the same arrangement of battery and relay as is shown in Fig. 4.

Figure 6:
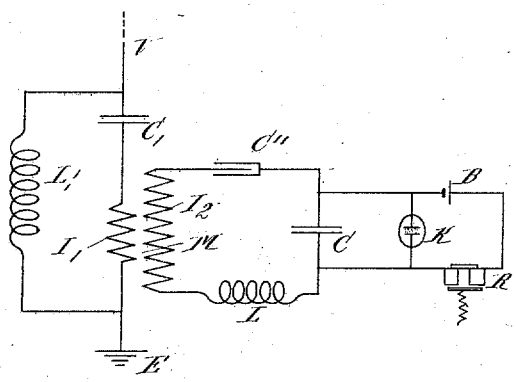
Figure 7:
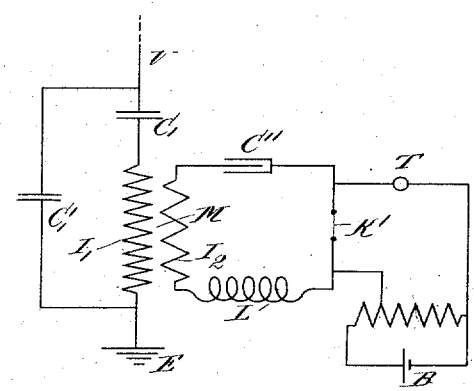
Figure 8:
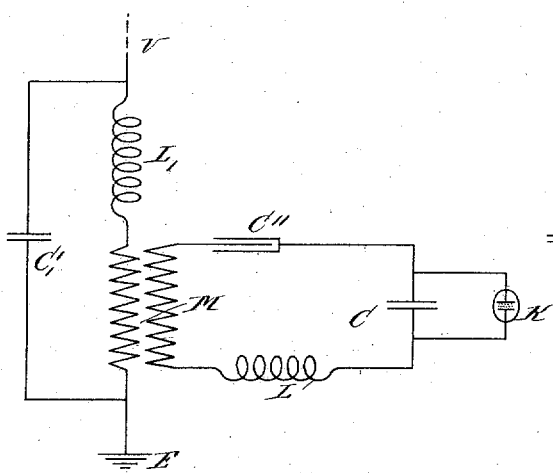

In Figs. 6, 7, and 8 I have shown three different embodiments of the herein-described invention applied to the receiving system shown in my Letters Patent Nos. 714,756 and 714,831. In these cases the resonant circuit $M\ C''\ C\ L$ is inductively associated with the elevated-conductor system, and the auxiliary coil L is employed to reduce the complex of interrelated circuits to the equivalent of a system of circuits each having a single degree of freedom.

Figure 9:
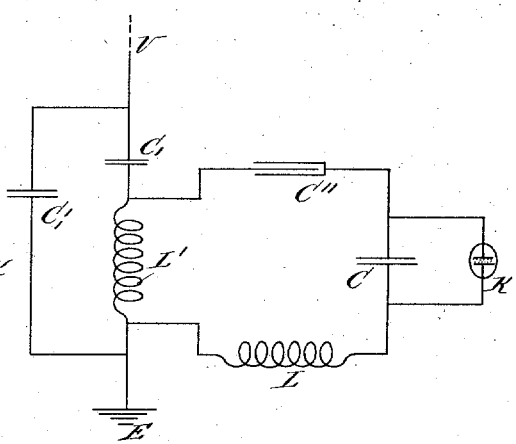
Figure 10:
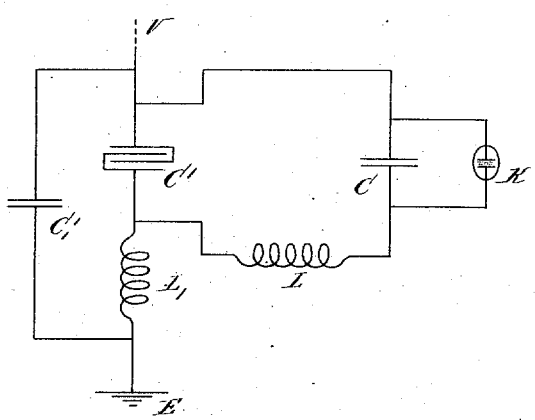

In Figs. 9 and 10 I have shown two other embodiments of this invention applied to the systems illustrated, respectively, in Figs. 4ª and 5ª.

Figure 19:
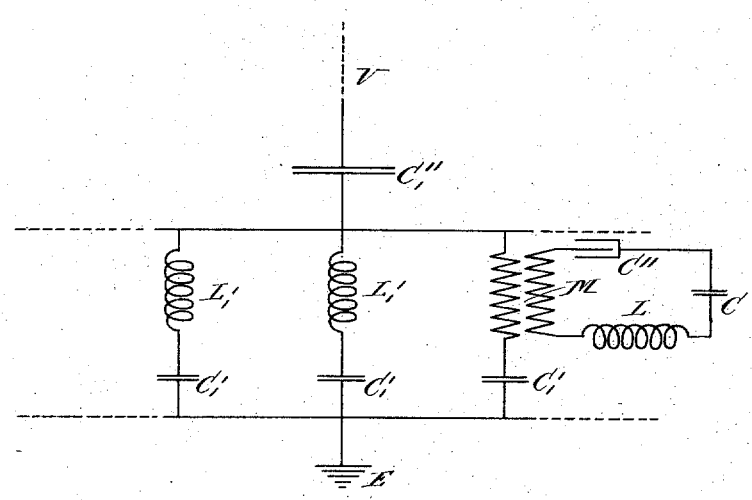
Figure 20:
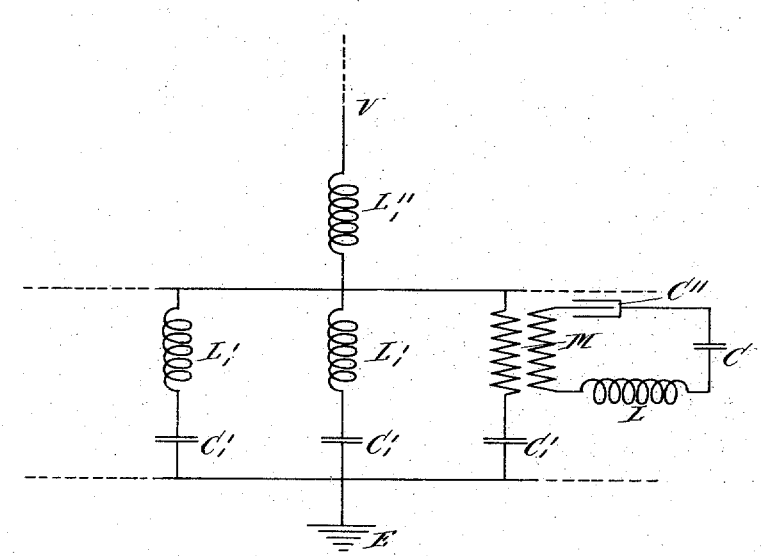

In Figs. 11 to 18, inclusive, I have shown several obvious modifications of the broad invention hereinbefore described; but I do not wish to be understood as confining myself to any of the specific means herein described, as it will be obvious to those skilled in the art that many other combinations of coils and condensers may be devised for carrying out the hereinbefore-stated objects of this invention, and more particularly do I not wish to be confined to two branch circuits in the elevated-conductor system or to two branch circuits alone, as three or more may be used, as indicated by dotted lines in Figs. 19 and 20; nor do I care to be confined to branch circuits alone, as it will be obvious to those skilled in the art that the loading of the elevated conductor in order to make it responsive to the waves of the frequency to which the local resonant circuit is attuned need not be wholly confined to the branch circuits, but may be in part supplied by a condenser or inductance-coil serially related to the branch circuits, as shown at $C_1''$ and $L_1''$ in Figs. 19 and 20.

In Figs. 1 to 3ª, inclusive, the means whereby the natural rates of vibration of the elevated-conductor system is made different from that of the associated resonant receiving-circuit $I_2\ C''\ C\ L$ is the condenser $C_1'$, connected in parallel to the primary winding $I_1$ of the transformer M. In Figs. 4 and 4ª this means is the condenser $C_1'$, connected in parallel with the coils $L_1$ and $L'$. In Figs. 5 and 5ª this means is the coil $L_1'$, connected in parallel with the condensers $C'\ C_1$.

In Fig. 6 the means employed for accomplishing the hereinbefore-stated objects of this invention is the coil $L_1'$, connected in parallel with the condenser $C_1$ and the primary winding of transformer M.

In Fig. 7 the means is the condenser $C_1'$, connected in parallel to the condenser $C_1$ and the primary winding of transformer M.

In Fig. 8 the means is the condenser $C_1'$, connected in parallel with the coil $L_1$ and the primary winding of transformer M.

In Fig. 9 the means is the condenser $C_1'$, connected in parallel with the condenser $C_1$ and coil $L'$.

In Fig. 10 the means is the condenser $C_1'$, connected in parallel with the condenser $C'$ and the coil $L_1$.

Figure 11:
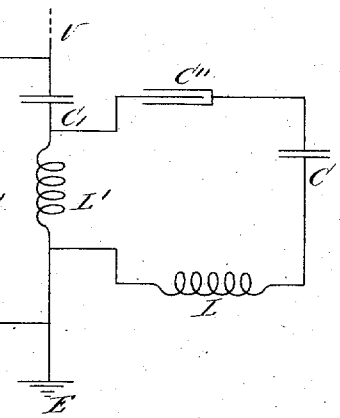
Figure 12:
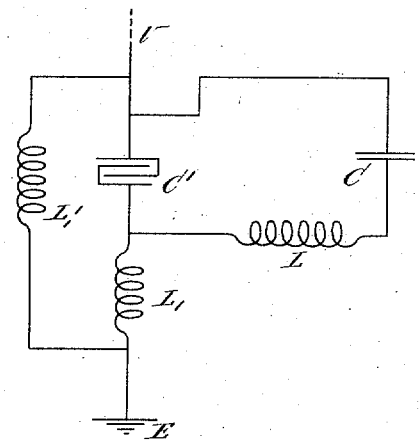
Figure 13:
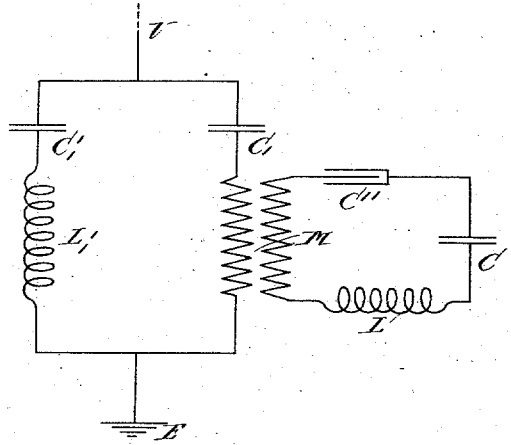
Figure 14:
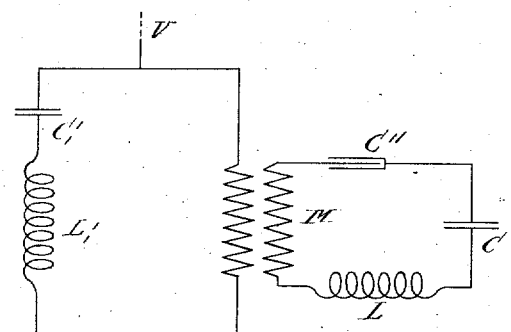
Figure 15:
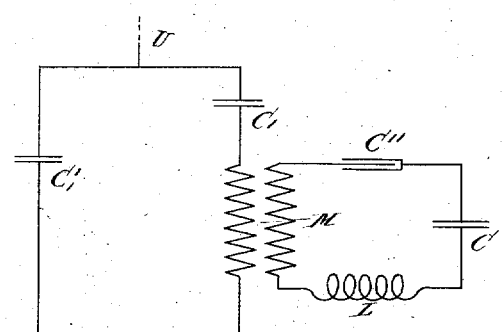
Figure 16:
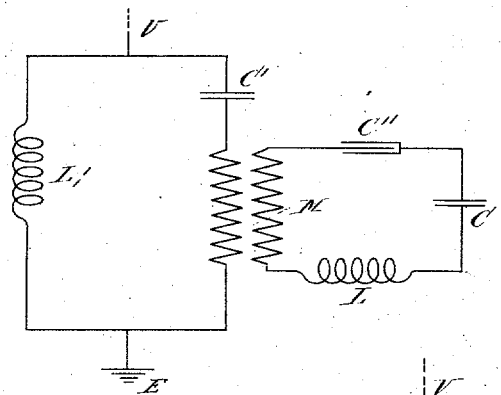
Figure 17:
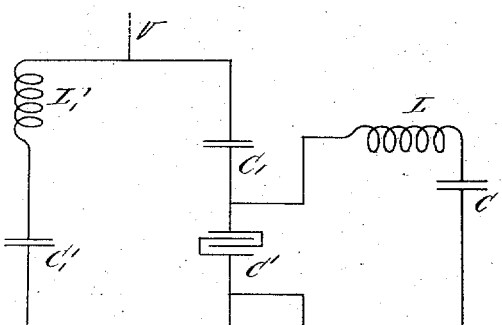
Figure 18:
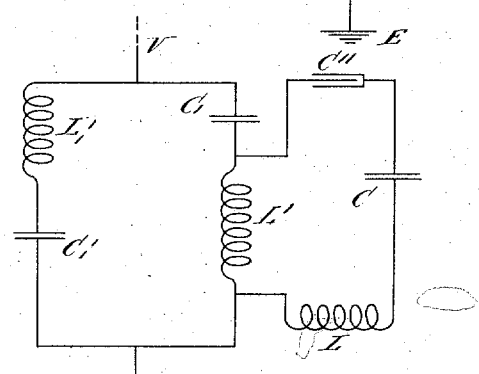

In Figs. 11 and 12 the means are the coils $L_1'$, connected in parallel, respectively, with the condenser $C_1$ and coil $L'$ and the condenser $C'$ and coil $L_1$.

In Figs. 13 to 18, inclusive, the means employed to give the elevated-conductor system natural periods of vibration different from that of the associated resonant receiving-circuits are the parallel branch circuits connected between the elevated conductor V and the earth E.

In Fig. 19 the means is the condenser $C_1''$, taken in connection with the three branch circuits therein shown, although, as before stated, any number of branch circuits may be employed, and in Fig. 20 the means is the coil $L_1''$, taken in conjunction with the three branch circuits shown in said figure, although any number of branch circuits may be used in this arrangement also.

Careful consideration will show that the branch circuits or other means employed for giving the elevated-conductor system natural rates of vibration different from that to which the associated resonant receiving-circuits are responsive interposed in the vertical wire near its earth connection will each present a definite inductance or capacity reactance for a predetermined frequency of impressed force and that said reactance will be different for different frequencies of the impressed force. If, therefore, the waves to be received are longer than those natural to the elevated conductor *per se* and the reactance of the elevated conductor *per se* is consequently a capacity reactance, the branch circuits may be so proportioned as to present for the frequency of these waves an inductance reactance equivalent to that which would be given by a loading-coil adapted to make the fundamental of the elevated conductor of a frequency equal to that of the waves to be received. The reactance offered by the elevated-conductor system to the electrical oscillations developed therein by a persistent train of simple harmonic waves the energy of which is to be received is therefore zero. Similarly, if the waves to be received are shorter than those natural to the elevated conductor *per se* and not less than one-half the length of those natural to the elevated conductor, the reactance of the elevated conductor *per se* is consequently an inductance reactance, and the branch circuits may be so proportioned as to present for the frequency of these waves a capacity reactance equivalent to that which would be presented by a loading-condenser adapted to make the fundamental of the elevated conductor of a frequency equal to that of the waves to be received. Here, again, the reactance offered by the elevated-conductor system to the electrical oscillations developed therein by a persistent train of simple harmonic waves the energy of which is to be received is zero. I find by experience that when such proportions are given to the constants of the loop-circuits the elevated-conductor system in responding to abrupt or impulsive electric forces has developed in it natural oscillaions of frequencies ill-adapted to cause a response of the associated resonant receiving circuit or circuits, because the frequencies of said natural oscillations are different from the frequency to which said resonant circuit or circuits is attuned.

In explanation of the foregoing, reference may be had to Figs. 21 to 28. A circuit consisting of two parallel branches, one of which contains a coil and the other a condenser, when connected in series with a source of simple harmonic electromotive force will present a definite reactance to the periodically-varying currents developed by said source of electromotive force, and this reactance may be either a capacity reactance or an inductance reactance, depending upon the frequency of the currents. Such a circuit is shown at B in Figs. 23, 24, 25, and 26. If the frequency of the currents impressed upon such a circuit is lower than the frequency to which the circuit is resonant when isolated, the reactance of the circuit is an inductance reactance, while if the frequency is higher than that to which the circuit is resonant when isolated the reactance is a capacity reactance. If the frequency be increased beyond that to which the circuit is resonant when isolated and up to infinity, the reactance of the circuit will at all times be a capacity reactance which will decrease in value until the frequency is infinite when the reactance vanishes. This may be best understood by having reference to Fig. 23$^a$, which is a curve drawn to rectangular coördinates in which the ordinates represent the reactance of the circuit, as described, and the abscissæ represent the periodicity (or $2\pi n$) of the impressed electromotive force. The frequency to which this circuit is resonant is indicated in the figure at point $n_1'$. This, however, is not true of a circuit whose inductance is distributed inductance and whose capacity is distributed capacity—such, for example, as the elevated conductor *per se* of the systems described herein. For such elevated conductors the reactance for low frequencies of impressed force is a capacity reactance. As the frequency is increased the reactance decreases until the frequency becomes equal to the fundamental frequency of such conductor, at which point the reactance becomes zero. For any increase of frequency beyond this point the reactance becomes an inductance reactance rising to a maximum value. At twice the fundamental frequency the reactance again becomes a capacity reactance and diminishes as the frequency is further increased until the frequency is equal to the first odd harmonic of the fundamental frequency, when the reactance again becomes zero. For further increase in frequency from this point the reactance again becomes an inductance reactance rising to a maximum value. At four times the fundamental frequency the reactance again changes to a capacity reactance and wanes as the frequency is further increased until the frequency is equal to the second odd harmonic of the fundamental frequency, when the reactance again becomes zero. The reactance of such a conductor is illustrated at Fig. 21, which is a curve drawn to rectangular coördinates, in which the ordinates represent the reactance at the center of the conductor and the abscissæ represent the periodicity of the impressed force. Attention is drawn to the fact that the reactance of the conductor is zero at the points $n_1''$ $n_3''$, these points corresponding, respectively, to the fundamental of the vertical conductor and its first odd harmonic. As a consequence of the mode of variation of reactance with frequency, shown in Fig. 21, the curve showing the variation with frequency of currents developed in an elevated conductor exhibits several maxima, one for the fundamental frequency $n_1''$ of said elevated conductor and one for each odd harmonic frequency $n_3''$, &c., as indicated in Fig. 22, where the ordinates represent the intensities of current and the abscissæ represent periodicities.

As hereinbefore stated, the first and second objects of this invention may be attained by giving the elevated-conductor system a pronounced fundamental of a frequency which is the same as that to which the associated resonant receiving circuit or circuits is attuned. If, therefore, the waves to be received are longer than those natural to the elevated conductor *per se*—*i. e.*, if the frequency of these waves is less than the fundamental frequency of the elevated conductor *per se* and the elevated conductor *per se* therefore offers a capacity reactance to the electrical oscillations developed in said elevated conductor—a loading-coil offering to oscillations of this frequency the proper inductance reactance inserted in the elevated conductor, as hereinbefore specified, will make the fundamental of the elevated-conductor system of a frequency equal to that of the waves to be received. In like manner a loading-condenser may be employed to balance the inductance reactance of the elevated conductor *per se* if the waves to be received are shorter than those natural to the elevated conductor *per se*, but are not less than one-half the length of those natural to the elevated conductor—*i. e.*, if the frequency of these waves is between the fundamental frequency $n_1''$ of the elevated conductor *per se* and the first even harmonic of said fundamental frequency $n_1''$. When, however, the elevated-conductor system is attuned as to its fundamental to the frequency $n$ of the waves to be received by such means, electromagnetic waves of different frequencies and of great intensity or abrupt or impulsive electric forces impinging upon the elevated conductor will cause the elevated-conductor system to vibrate at its fundamental rate. In other words, there will be developed in such elevated-conductor system electrical oscillations of frequency $n$. If, therefore, the associated resonant circuit be made resonant to said frequency $n$, electrical oscillations of the corresponding frequency to which it is made resonant will be developed therein and will effect the response of the receiver or wave-detector. It is for this reason that I do not employ a loading-coil or a loading-condenser to attune the fundamental of the elevated-conductor system to the frequency of the waves to be received—*i. e.*, to the frequency of the waves to which the associated resonant receiving-circuit is made resonant. However, by balancing the reactance of the elevated conductor *per se* by the reactance of the various combinations of coils and condensers described in this application, which combinations of coils and condensers offer an inductance reactance or a capacity reactance for the frequency of the waves to be received equivalent, respectively, to that of a loading-coil or a loading-condenser adapted to make the fundamental of the elevated conductor of a frequency equal to that of the waves to be received, the natural electrical oscillations developed in said elevated-conductor system by intense electromagnetic waves of frequencies to which the associated resonant receiving-circuit is not resonant or by abrupt or impulsive electric forces are either of lower frequency or of higher frequency than that to which such associated resonant receiving-circuit is responsive, and thus but feeble currents are developed in the resonant receiving-circuit, and the receiver is not affected. In explanation of this attention is called to the fact that, as hereinbefore stated, the third object of this invention is accomplished by giving the elevated-conductor system a plurality of degrees of freedom—*i. e.*, by giving said elevated-conductor system natural rates of vibration different from the frequency of the waves the energy of which is to be received, and consequently different from the frequency to which the resonant receiving-circuit is made resonant. The term "plurality of degrees of freedom" is used herein as it was used by me in my United States Letters Patent No. 714,756, December 2, 1902, and No. 737,170, August 25, 1903, to which reference may be had. In Figs. 24 and 25 I have illustrated systems A B of at least three degrees of freedom, each inductively associated with a resonant circuit D, and in Fig. 26 I have illustrated an elevated-conductor system A B of at least three degrees of freedom inductively associated with a resonant receiving-circuit D. In Figs. 24 and 25, A is a circuit containing a condenser and an inductance-coil and having a fundamental natural frequency when conductively connected with circuit B, (represented by $n''$.) B is a circuit containing a condenser and an inductance-coil and having a natural fundamental frequency when conductively connected with circuit A, (represented by $n'$.) D is a resonant circuit inductively associated with the system A B. The mutual inductance between the circuit D and the system A B is made small, so that the natural periods of circuit D and of the system A B will not be materially affected by their association.

When the two circuits A and B are associated by conductive connections, a system of three degrees of freedom results, and in the natural oscillatory restoration to electrical equilibrium of such a system the currents are not of a single frequency, but consist of a superposition of at least two currents of different frequencies, each of which currents is found in each of the circuits A and B of the conductively-connected system. If, therefore, the natural period of the resonator-circuit D be varied from zero to infinity, the curve showing the variation with the frequency of the intensity of the currents developed in the circuit D by the natural oscillatory restoration to electrical equilibrium of the system A B will exhibit at least two maxima, one of which will correspond to frequency $n'$ and another to frequency $n''$, as shown in Fig. 24ª. In like manner, if the spark-gap $s$ of Fig. 24 be closed by a conductor the system A B will be found to respond more strongly to currents of frequencies $n'$ and $n''$ than to currents of other frequencies impressed upon it. Here again currents of frequency $n'$ and frequency $n''$ are found in each of the circuits and may be selected by the resonator-circuit D. If, however, forced electrical oscillations of frequency $n$ be impressed upon the system A B by the sonorous circuit F (shown in Fig. 25) or by other suitable means, if for oscillations of this frequency circuit A offer a capacity reaction, and if for oscillations of this frequency circuit B offer an inductance reactance equivalent to that of a loading-coil adapted to make the fundamental frequency of the system A B equal to the frequency $n$ of the impressed force, then the reactance of the system A B for forced electrical oscillations of frequency $n$ will be zero, currents of maximum amplitude of frequency $n$ will be developed in circuit D, and the curve showing the variations with frequency of currents in circuit D will exhibit but a single maximum, which will correspond to frequency $n$, as indicated in Fig. 25$^a$.

In Fig. 26 I have illustrated one system for carrying out the principle above explained. This system is the same as that illustrated in Fig. 1 of this application. The circuit A is an elevated conductor, which may be considered as the circuit A in Fig. 24, elevated and extended so as to have by virtue of its distributed inductance and its distributed capacity the same capacity reactance for oscillations of frequency $n$ as circuit A in Figs. 24 and 25 and to have a fundamental equal to the natural period of circuit A. The fundamental frequency of the elevated conductor A when conductively connected with circuit B is as before $n''$. The circuit B of Fig. 26 corresponds to circuits B of Figs. 24 and 25, and its natural frequency when conductively connected with circuit A is as before $n'$. The circuit D is a resonant receiving-circuit attuned to frequency $n$, and this circuit corresponds to the resonator-circuit D of Figs. 24 and 25.

If a persistent train of electromagnetic waves of frequency $n$ create forced electrical oscillations of like frequency in the elevated-conductor system A B, if for electrical oscillations of this frequency the circuit A offer a capacity reactance, and if for oscillations of this frequency the circuit B offer an inductance reactance equivalent to that of a loading-coil adapted to make the fundamental frequency of the system A B equal to the frequency $n$ of the impressed force, then the reactance of the system A B for forced oscillations of frequency $n$ will be zero, currents of maximum amplitude of frequency $n$ will be developed in circuit D, and the curve showing the variation with frequency of the currents developed in circuit D will exhibit but a single maximum, which will correspond to frequency $n$, as indicated in Fig. 25$^a$; but if the frequency of the train of electromagnetic waves be varied from zero to infinity and the period of the associated resonant circuit D be correspondingly varied two maxima will be observed in the currents in circuit D, one at frequency $n$ and the other at frequency $n''$, as shown at Fig. 26$^a$, which is a curve drawn to rectangular coördinates in which the ordinates represent currents in the circuit D, and the abscissæ represent the periodicity of said currents.

Attention is drawn to the difference between the curves representing the response of the elevated-conductor system to the natural oscillations and to forced oscillations of the frequency to which the associated resonant circuit is attuned. In the former case the area inclosed between the curve and its abscissæ is much greater than the corresponding area in the latter case, which shows that when the elevated-conductor system is disturbed by abrupt or impulsive electric forces a by far greater amount of energy is absorbed and redistributed by said natural oscillations, which, as shown in Fig. 26$^a$, are of frequencies different from that to which the associated resonant circuit is attuned and that therefore said resonant circuit is not affected by such abrupt or impulsive electric forces.

The curves herein represented in Figs. 21, 22, 24$^a$, 25$^a$, and 26$^a$, though not drawn to scale, are nevertheless based upon curves drawn from computations made, which computations have been verified by actual experiments both in the laboratory and between two stations twelve miles apart.

Figures 27, 28:
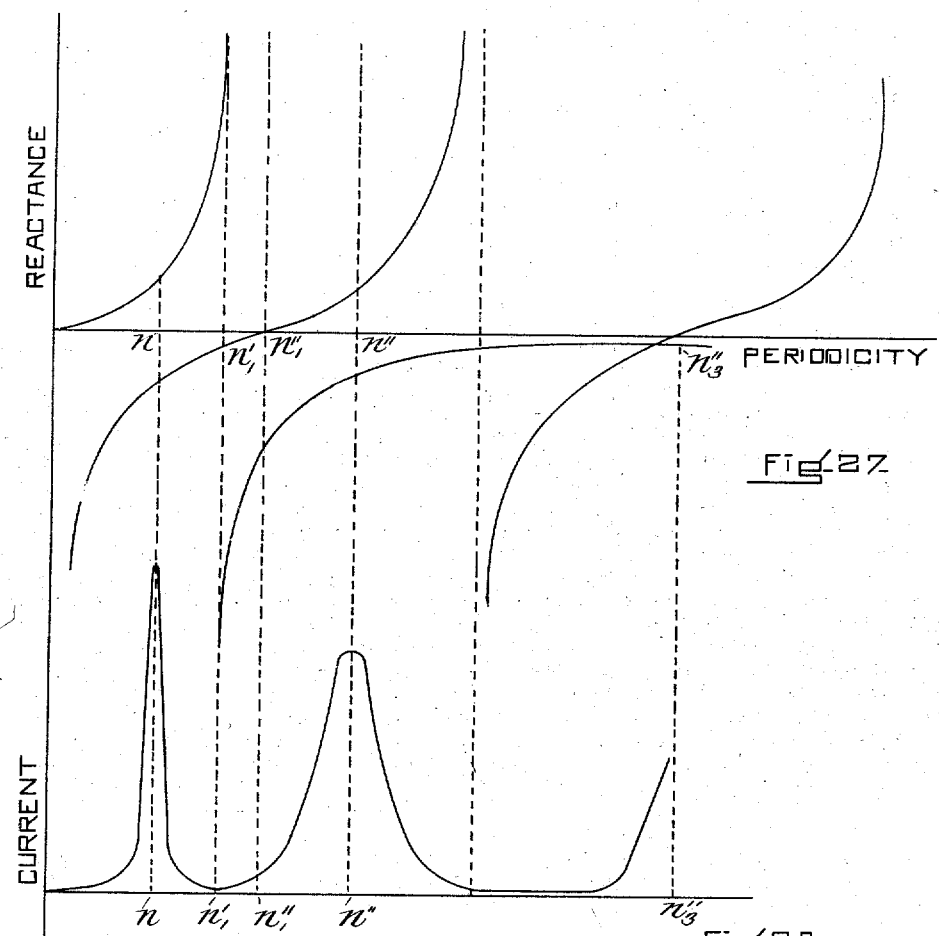

The curve represented in Fig. 27 shows the variation of the various reactances hereinbefore referred to with frequency. In this curve $n$ represents the frequency of the waves the energy of which is to be received, being the frequency of the associated resonant circuit. $n'_1$ is the frequency to which the loop-circuit B would be resonant if isolated. $n''_1$ is the natural rate of vibration of the vertical when isolated. $n''$ is the natural period of the elevated conductor as affected by its association with the loop-circuit B.

The curve represented in Fig. 28 shows the amplitudes of the currents developed in the elevated conductor which correspond to various frequencies of impressed force.

While I have discussed in the foregoing a very simple case involved in that embodiment of the herein-described invention which is illustrated in Fig. 1, it will be understood that the explanation of the operation of the other systems herein described is broadly the same as that of the system of said Fig. 1.

I claim—

1. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, and conveying or translating said electrical oscillations to a resonant receiving-circuit, attuned to the frequency of the waves the energy of which is to be received.

2. As an improvement in the art of receiving space-telegraph signals the method herein described of preventing the tuned or resonant receiving-circuit of a space-telegraph receiving system from responding to extraneous electrical impulses of a frequency to which said circuit is not attuned, or to abrupt or impulsive electrical forces, by giving the elevated receiving-conductor system natural rates of vibration different from that of the associated tuned or resonant receiving-circuit.

3. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, conveying or translating said electrical oscillations to a resonant receiving-circuit, attuned to the frequency of the waves the energy of which is to be received, amplifying said oscillations by means of said resonant circuit and thereby operating a signal-indicating device.

4. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, causing said electrical oscillations to inductively reproduce corresponding oscillations in a resonant receiving-circuit associated with said elevated-conductor system and attuned to the frequency of the waves the energy of which is to be received, amplifying said oscillations by means of said resonant circuit and thereby operating a signal-indicating device.

5. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, causing said electrical oscillations to inductively reproduce corresponding oscillations at increased potential in a resonant receiving-circuit associated with said elevated-conductor system and attuned to the frequency of the waves the energy of which is to be received, amplifying said oscillations by means of said resonant circuit and thereby operating a signal-indicating device.

6. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, causing said electrical oscillations to inductively reproduce corresponding oscillations at increased current in a resonant receiving-circuit associated with said elevated-conductor system and attuned to the frequency of the waves the energy of which is to be received, amplifying said oscillations by means of said resonant circuit and thereby operating a signal-indicating device.

7. The method of preventing the response of the tuned receiving-circuit of a space-telegraph receiving system to electrical impulses of frequencies to which said circuit is not attuned or to abrupt or impulsive electrical forces, which consists in balancing the reactance of the elevated conductor *per se* by the reactance of a combination of coils and condensers presenting, for the frequency to which said circuit is attuned, a reactance equivalent to that of a loading coil or condenser adapted to make the fundamental of the elevated conductor equal to the frequency of the waves the energy of which is to be received and thereby giving the elevated-conductor system natural rates of vibration different from that to which the tuned receiving-circuit is responsive.

In testimony whereof I have hereunto subscribed my name this 11th day of February, 1904.

JOHN STONE STONE.

Witnesses:
BRAINERD T. JUDKINS,
G. ADELAIDE HIGGINS.

---

Corrections in Letters Patent No. 767,995.

It is hereby certified that in Letters Patent No. 767,995, granted August 16, 1904, upon the application of John Stone Stone, of Cambridge, Massachusetts, for an improvement in "Space Telegraphy," errors appear in the printed specification requiring correction, as follows: On page 4, line 105, the comma after the word "frequency" should be stricken out, in line 124 a comma should be inserted after "*per se*," and in line 127 a comma should be substituted for the dash after the word "conductor;" on page 5, lines 84 and 88, the parentheses inclosing "represented by *n*" should be stricken out, and in line 128 the word "reaction" should read *reactance;* and that the said Letters Patent should be read with these corrections therein that the same may conform to the record of the case in the Patent Office.

Signed and sealed this 20th day of December, A. D., 1904.

[SEAL.]

F. I. ALLEN,
*Commissioner of Patents.* said circuit is not attuned, or to abrupt or impulsive electrical forces, by giving the elevated receiving-conductor system natural rates of vibration different from that of the associated tuned or resonant receiving-circuit.

3. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, conveying or translating said electrical oscillations to a resonant receiving-circuit, attuned to the frequency of the waves the energy of which is to be received, amplifying said oscillations by means of said resonant circuit and thereby operating a signal-indicating device.

4. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, causing said electrical oscillations to inductively reproduce corresponding oscillations in a resonant receiving-circuit associated with said elevated-conductor system and attuned to the frequency of the waves the energy of which is to be received, amplifying said oscillations by means of said resonant circuit and thereby operating a signal-indicating device.

5. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, causing said electrical oscillations to inductively reproduce corresponding oscillations at increased potential in a resonant receiving-circuit associated with said elevated-conductor system and attuned to the frequency of the waves the energy of which is to be received, amplifying said oscillations by means of said resonant circuit and thereby operating a signal-indicating device.

6. The method of receiving space-telegraph signals, which consists in absorbing the energy of electromagnetic waves in an elevated-conductor system, attuned as to its natural rates of vibration to frequencies different from that of the waves the energy of which is to be received, thereby creating electrical oscillations in said elevated-conductor system, causing said electrical oscillations to inductively reproduce corresponding oscillations at increased current in a resonant receiving-circuit associated with said elevated-conductor system and attuned to the frequency of the waves the energy of which is to be received, amplifying said oscillations by means of said resonant circuit and thereby operating a signal-indicating device.

7. The method of preventing the response of the tuned receiving-circuit of a space-telegraph receiving system to electrical impulses of frequencies to which said circuit is not attuned or to abrupt or impulsive electrical forces, which consists in balancing the reactance of the elevated conductor *per se* by the reactance of a combination of coils and condensers presenting, for the frequency to which said circuit is attuned, a reactance equivalent to that of a loading coil or condenser adapted to make the fundamental of the elevated conductor equal to the frequency of the waves the energy of which is to be received and thereby giving the elevated-conductor system natural rates of vibration different from that to which the tuned receiving-circuit is responsive.

In testimony whereof I have hereunto subscribed my name this 11th day of February, 1904.

JOHN STONE STONE.

Witnesses:
BRAINERD T. JUDKINS,
G. ADELAIDE HIGGINS.

---

Corrections in Letters Patent No. 767,995.

It is hereby certified that in Letters Patent No. 767,995, granted August 16, 1904, upon the application of John Stone Stone, of Cambridge, Massachusetts, for an improvement in "Space Telegraphy," errors appear in the printed specification requiring correction, as follows: On page 4, line 105, the comma after the word "frequency" should be stricken out, in line 124 a comma should be inserted after "*per se*," and in line 127 a comma should be substituted for the dash after the word "conductor;" on page 5, lines 84 and 88, the parentheses inclosing "represented by *n*" should be stricken out, and in line 128 the word "reaction" should read *reactance;* and that the said Letters Patent should be read with these corrections therein that the same may conform to the record of the case in the Patent Office.

Signed and sealed this 20th day of December, A. D., 1904.

[SEAL.]

F. I. ALLEN,
*Commissioner of Patents.*

It is hereby certified that in Letters Patent No. 767,995, granted August 16, 1904, upon the application of John Stone Stone, of Cambridge, Massachusetts, for an improvement in "Space Telegraphy," errors appear in the printed specification requiring correction, as follows: On page 4, line 105, the comma after the word "frequency" should be stricken out, in line 124 a comma should be inserted after "*per se*," and in line 127 a comma should be substituted for the dash after the word "conductor;" on page 5, lines 84 and 88, the parentheses inclosing "represented by $n$" should be stricken out, and in line 128 the word "reaction" should read *reactance;* and that the said Letters Patent should be read with these corrections therein that the same may conform to the record of the case in the Patent Office.

Signed and sealed this 20th day of December, A. D., 1904.

[SEAL.]

F. I. ALLEN,
*Commissioner of Patents.*